United States Patent [19]

Stephenson

[11] Patent Number: 5,742,861
[45] Date of Patent: Apr. 21, 1998

[54] ELECTRONIC CAMERA AND ASSOCIATED PRINTER WHICH USES A DISPLAY IMAGE

[75] Inventor: Stanley W. Stephenson, Rochester, N.Y.

[73] Assignee: Eastman Kodak Company, Rochester, N.Y.

[21] Appl. No.: 778,231

[22] Filed: Jan. 8, 1997

[51] Int. Cl.$^6$ .................... G03B 29/00; G03B 17/50; H04N 5/30
[52] U.S. Cl. .................... 396/429; 396/30; 358/906; 358/909.1
[58] Field of Search .................... 396/30, 33, 36, 396/37, 374, 429, 430; 358/296, 302, 401, 501, 906, 909.1; 348/207, 373, 552, 839; 347/1, 2, 108

[56] References Cited

U.S. PATENT DOCUMENTS

| | | | |
|---|---|---|---|
| 4,262,301 | 4/1981 | Erlichman | 358/906 |
| 4,768,050 | 8/1988 | Beery | 396/614 |
| 4,937,676 | 6/1990 | Finelli et al. | 358/906 |
| 5,032,911 | 7/1991 | Takimoto | 358/501 |
| 5,049,902 | 9/1991 | Duke | 347/172 |
| 5,122,432 | 6/1992 | Hammann, IV et al. | 430/138 |
| 5,164,751 | 11/1992 | Weyer | 396/430 |
| 5,493,409 | 2/1996 | Maeda et al. | 396/429 |
| 5,619,738 | 4/1997 | Petruchik et al. | 396/374 |

*Primary Examiner*—A. A. Mathews
*Attorney, Agent, or Firm*—Raymond L. Owens

[57] ABSTRACT

Apparatus for capturing and printing images on a photosensitive sheet is disclosed. The apparatus includes a camera for electronically storing an image of a subject and having a display for displaying such stored image and including an alignment structure, and a printer receiving a stack of photosensitive sheets and interleave cover sheets, with each cover sheet preventing exposure of an underlying photosensitive sheet. In order to image the display image onto photosensitive sheets, the apparatus is effective after an image is formed on the display for deactivating the display image and includes a sheet drive structure for causing a cover sheet to be removed from the stack and then reactivate the display image. Further, the apparatus has an optical arrangement for focusing the display area onto said photosensitive sheet and provides electronic communication between the electronic camera and the printer so that the printing area of said display is imaged on the uncovered photosensitive sheet.

6 Claims, 3 Drawing Sheets

1

ELECTRONIC CAMERA AND ASSOCIATED PRINTER WHICH USES A DISPLAY IMAGE

FIELD OF THE INVENTION

The present invention relates to electronic cameras and to the printing of images produced by such camera.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera.

A shortcoming with prior electronic cameras is that data must be transmitted from the electronic camera to printer. Interfaces must be present to transfer the dam. As disclosed in U.S. Pat. No. 5,032,911, printers that write to light sensitive media print must have means within the printer that operate on received data and convert the data into modulated light to mark the photosensitive sheet. Many newer electronic cameras incorporate light emitting displays to view a captured image. However, the apparatus for producing such images is not available for light writing onto photosensitive media.

SUMMARY OF THE INVENTION

It is an object of the present invention to make use of an electronic image display in an electronic camera to write directly onto light sensitive media which can effectively provide a hard copy.

This object is achieved by apparatus for capturing and printing images on a photosensitive sheet, comprising:

(a) a camera for electronically storing an image of a subject and having a display for displaying such stored image and including alignment means;

(b) a printer including means for receiving a stack of photosensitive sheets and interleave cover sheets, with each cover sheet preventing exposure of an underlying photosensitive sheet;

(c) means for imaging the display image onto photosensitive sheets including:

(d) means effective after an image is formed on the display for deactivating the display image and including drive means for causing a cover sheet to be removed from the stack and then reactivating the display image, such means including:

(i) optical means for focusing the display area onto said photosensitive sheet; and (ii) means for activating and deactivating the display image on the electronic camera to provide selective exposure of a media sheet.

ADVANTAGES

A feature of this invention is that a camera display can be used to directly write onto the light sensitive media. The printer provides a simple configuration that permits for exposure of a photosensitive sheet when the printer is in contact with camera. An electronic interconnection between the printer and the camera controls electronic camera display to produce an image on the photosensitive sheet.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from electronic capture devices. Typically, interface electronics is disposed in each device and data is transmitted from the electronic camera to the printer.

Figure 1:
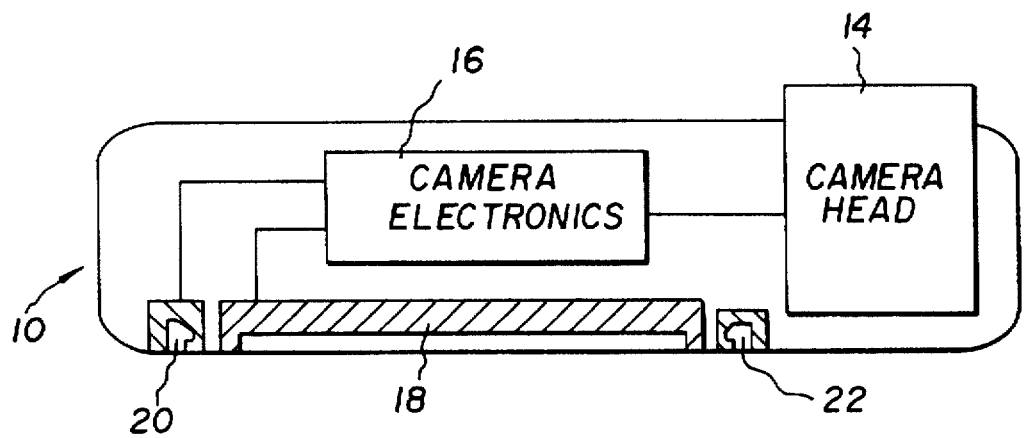
FIG. 1 is a top section view of an electronic camera which is adapted to be coupled to a printer in accordance with the present invention.
Figure 2:
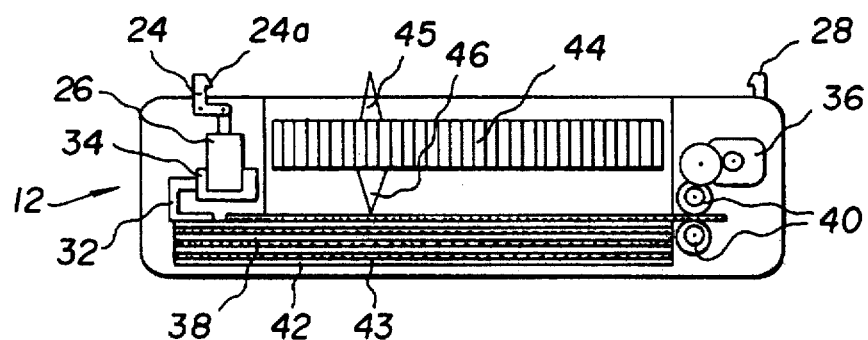
FIG. 2 is a top section view of the printer which is adapted to be coupled to the electronic camera of FIG. 1.

Turning now to FIG. 1, an electronic camera 10 is shown, and to FIG. 2 where a printer 12 is shown. Electronic camera 10 is of conventional design and can capture either still or motion images. Images are captured by a camera head 14 and transferred to camera electronics 16. Camera electronics 16 is capable of displaying still images on a camera display 18. The camera display 18 can be, for instance, a liquid crystal display (LCD) or an organic polymer display system of conventional design.

Electronic camera 10, in accordance with the present invention, includes an active socket 20 and a passive socket 22 for the purpose of securing the printer 12 over camera display 18. Active socket 20 incorporates electronic sensing circuitry to communicate with the printer 12. Active socket 20 can include an electrical connection coupled to the camera electronics 16 and facilitates communication with the printer 12. Alternatively, a light sensing/transmitting assembly can be incorporated in or near the active socket 20. The camera electronics provides electronic communication between the electronic camera 10 and the printer 12.

Figure 4:
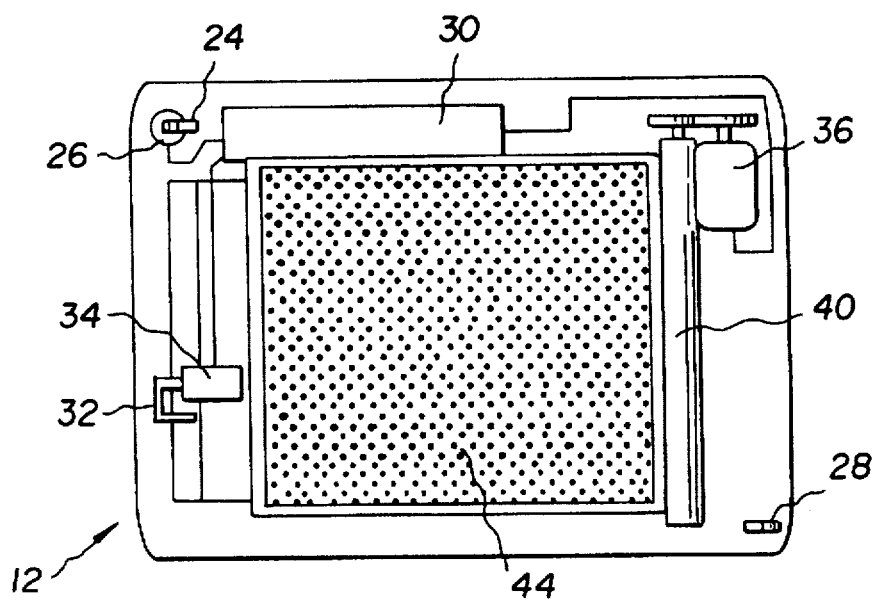
FIG. 4 is a front sectional view showing portions of the printer of FIG. 2.
Figure 5:
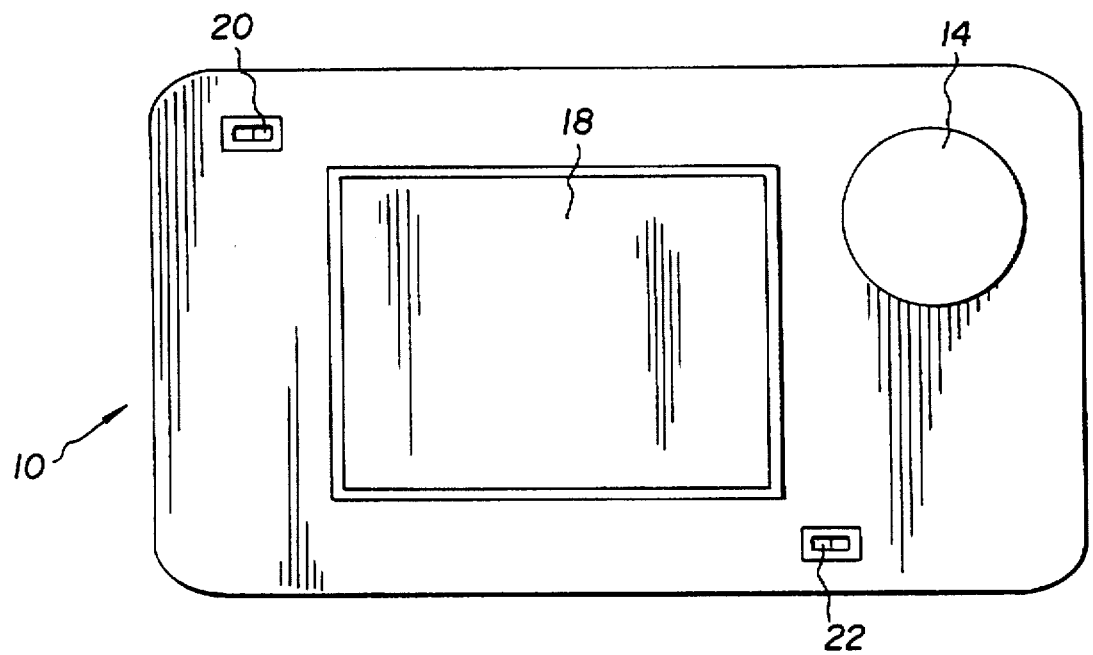
FIG. 5 is a rear view of the electronic camera shown in FIG. 1.

The printer 12 has an active latch 24 and a passive latch 28 that permits the printer to be secured over the camera display 18. In this embodiment the latches 24 and 28 are hooked and secure to matching detail 24a formed in the sockets 20 and 22 of camera 10. The rear view of the camera in FIG. 5 shows the position of the active socket 20 and the passive socket 22 and camera display 18. A latch driver 26 permits the selective securing and release of primer 12 from camera 10 under control of printer electronics 30 shown in FIG. 4. A compliant, light tight mask (not shown) is disposed between the printer 12 and the electronic camera 10 to provide a light tight seal.

Printer 12 contains a stack of media sheets 38. These sheets are loaded into the printer 12 and stored in a light sensitive manner as is known in the art. A picker 32 is driven by a picker drive 34 and urges a single sheet from media sheets 38 into processing rollers 40. Processing rollers 40 are driven by roller drive 36 to pull a sheet through processing rollers 40 and out of the printer.

Figure 3:
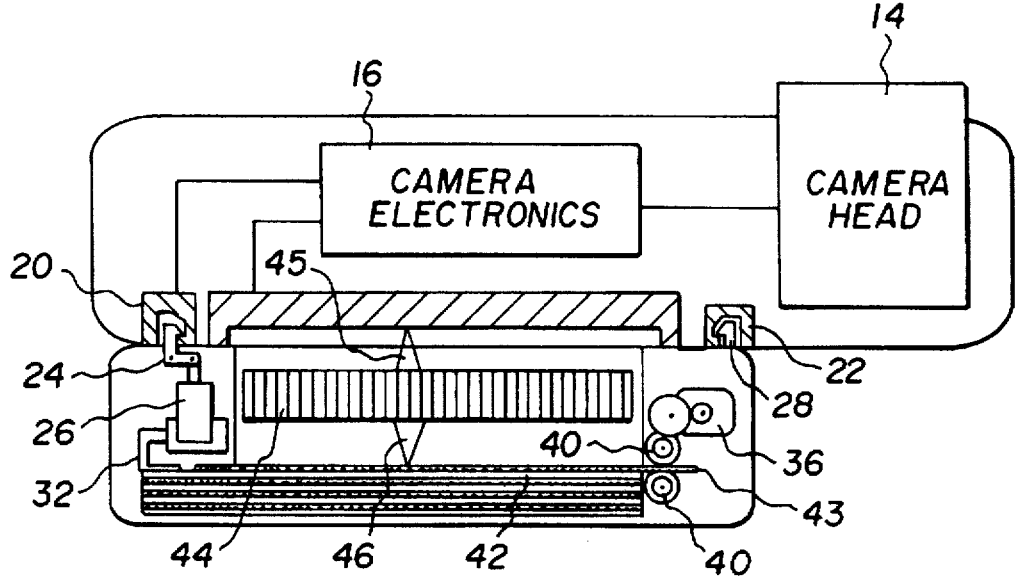
FIG. 3 shows the printer of FIG. 2 attached to the electronic camera of FIG. 1.

In one embodiment shown in FIG. 3, printing optic 44 is an array of gradient index rods that have been formed into an array that transfers a focused image area of camera display 18 onto the top sheet in the stack of media sheets 38. Printing optic 44 can be formed from Nippon Sheet Glass rod lens array type 20B which has a total conjugate 15.1 min. The actual rod is 6.89 mm tall and first working distance 45 and second working distance 46 are 4.10 mm. Alternatively, printing optic 44 can be formed from a set of plates containing micro-optic elements. The printing optics focuses a display area from the display onto a photosensitive sheet for printing.

The sockets and latches are dimensionally controlled so as to align printing optic 44 with the light emitting elements of camera display 18. The first working distance 45 is located at the interface to focus on the light emitting elements of camera display 18. Second working distance 46 is provided for forming an image on the imaging surface on the top sheet of the media sheets 38. Printing optic 44 is accurately positioned relative to the camera display 18 when the printer is secured to the camera 10.

Media sheets 38 (shown in FIGS. 2 and 3) include interleaved sheets of a first cover sheet 43 which lies on top of a matching photosensitive sheet 42 to prevent exposure of an underlying photosensitive sheet. Each cover sheet 43 is light opaque, and has physical characteristics similar to photosensitive sheet 42 to permit a common pick/processor to operate on both types of sheets. Photosensitive sheets 42 can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time. The media sheets 38 are housed in a light tight fashion and are loaded from the bottom of printer 12. Media sheets 38 can conveniently be included in a cartridge which contains a receptacle for receiving cover sheets 43.

Printer 12 uses picker drive 34 to move picker 32 to force a single sheet from media sheets 38. Picker 32 moves a sheet into processing rollers 40 which are driven by roller drive 36. Roller drive 36 is operated for a period of time that permits the sheet to be delivered through processing rollers 40 and out of the printer 12.

Figure 6A:
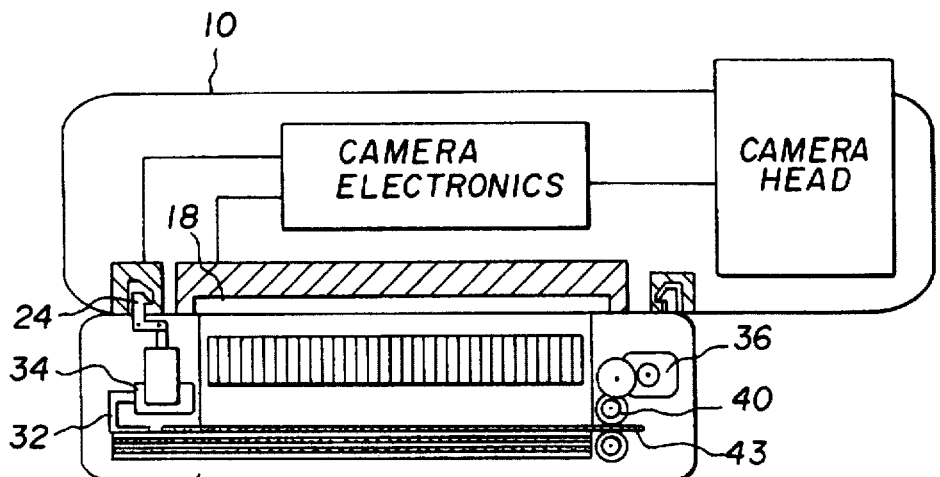
FIGS. 6a, 6b, and 6c show an operating sequence of the camera printer arrangement.
Figure 6B:
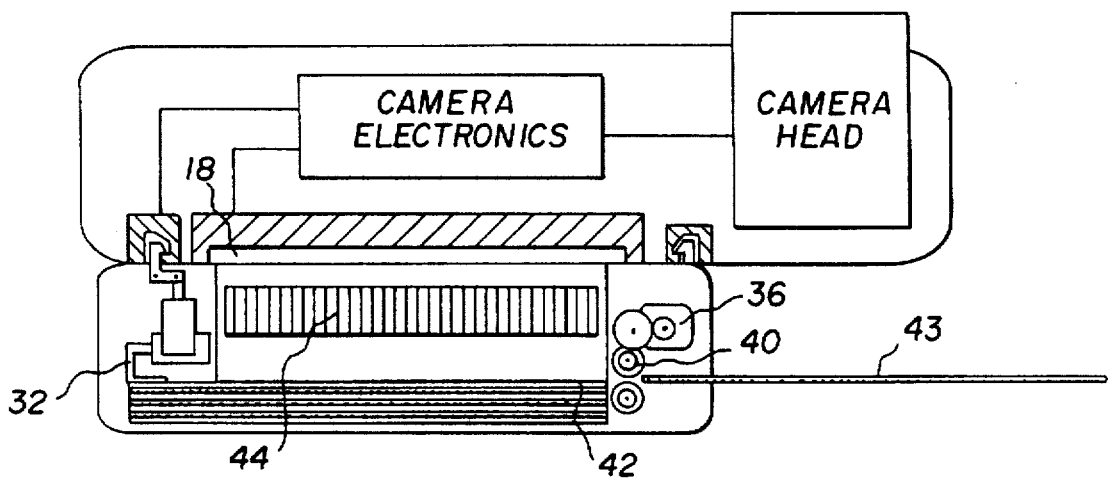
Figure 6C:
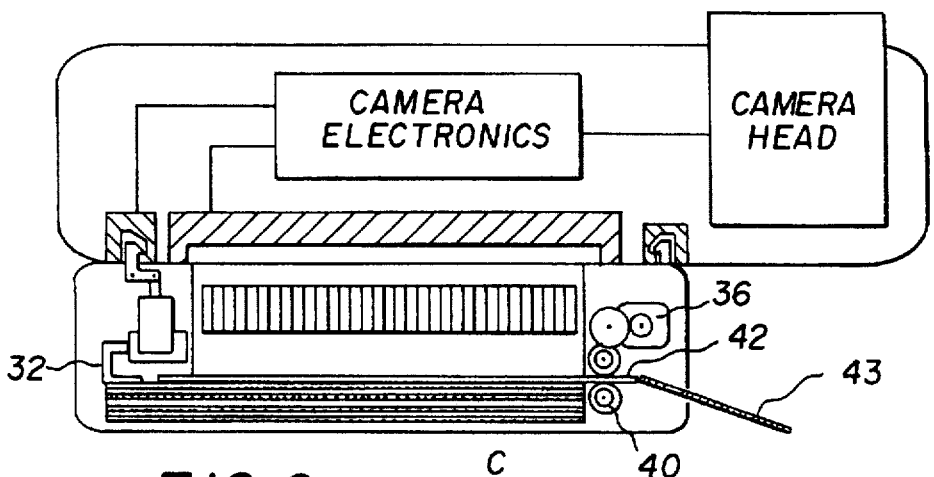

The operation of printer 10 in conjunction with electronic camera 10 is shown in FIGS. 6a–6c. An operator obtains a print by mounting the printer 12 with the electronic camera 10. Latches 24 and 28 automatically secure printer 12 in a light tight manner relative to the camera display 18 on electronic camera 10. The operator signals the start of printing using printer electronics 30. Printer 12 signals camera 10 to turn off the camera display 18. Printer electronics 30 then actuates picker drive 34 to advance picker 32 against cover sheet 43. Simultaneously, printer electronics 30 actuates roller drive 36 to turn processing roller 40. Cover sheet 43 enters processing rollers 40 and is ejected from printer 12. Alternatively, cover sheet 43 can be directed into a storage receptacle associated with the cartridge holding media sheets 38. Photosensitive sheet 42 is now exposed to the camera display 18.

Printer electronics 30 signals camera electronics 16 to activate camera display 18. A portion of the image on the camera display 18 is focused by printing optic 44 onto photosensitive sheet 42. Printer electronics 30 activates the camera display 18 for a length of time that permits correct exposure of photosensitive sheet 42. Printer electronics 30 then signals for camera display 18 to be turned off. Printer electronics 30 then actuates picker drive 34 to use picker 32 to force photosensitive sheet 42 into processing rollers 40. As photosensitive sheet 42 passes through processing rollers 40, chemical processes within photosensitive sheet 42 are activated to create and stabilize an image of camera display 18.

The use of the latch driver 26 under the control of printer electronics 30 ensures that printer 12 is not detached from electronic camera 10 during image the printing operation from camera display 18 to a photosensitive sheet 42. An operator detaches printer 12 from electronic camera 10 using an interface to printer electronics 30 such as a conventional switch. Printer electronics 30 then activates latch driver 26 to permit removal of printer 12 from camera 10.

The invention has been described in detail with particular reference to a certain preferred embodiment thereof, but it will be understood that variations and modifications can be effected within the spirit and scope of the invention.

PARTS LIST 10 electronic camera
12 printer
14 camera head
16 camera electronics
18 camera display
20 active socket
22 passive socket
24 active latch
24a a detail
26 latch driver
28 passive latch
30 printer electronics
32 picker
34 picker drive
36 roller drive
38 media sheets
40 processing rollers
42 photosensitive sheet
43 cover sheet
44 printing optic
45 first working distance
46 second working distance

I claim:

1. Apparatus for capturing and printing images on a photosensitive sheet, comprising:
   (a) a camera for electronically storing an image of a subject and having a display for displaying such stored image;
   (b) a printer including means for receiving a stack of photosensitive sheets and interleave cover sheets, with each cover sheet preventing exposure of an underlying photosensitive sheet;
   (c) means for imaging the display image onto photosensitive sheets including:
   (d) means effective after an image is formed on the display for deactivating the display image and including drive means for causing a cover sheet to be removed from the stack and then reactivating the display image, such deactivating means including:
      (i) optical means for focusing the display area onto said photosensitive sheet; and
      (ii) means for activating and deactivating the display image on the electronic camera to provide selective exposure of a media sheet.

2. The apparatus of claim 1 wherein the camera includes alignment means having an active socket which includes electronic sensing circuitry for communicating with the printer.

3. The apparatus of claim 1 wherein the camera includes an active socket which includes electronic sensing circuitry for communicating with the printer.

4. The apparatus of claim 1 further including means for preventing the printer from being detached from the camera when there is electronic communication between the display and the printer.

5. The apparatus of claim 1 wherein the optical means includes rod lens arrays.

6. Apparatus for capturing and printing images on a photosensitive sheet, comprising:
   (a) a camera for electronically storing an image of a subject and having a display for displaying such stored image;
   (b) a printer including means for receiving a stack of photosensitive sheets and alternating interleave cover sheets, with each cover sheet preventing exposure of an underlying photosensitive sheet, each cover sheet is light opaque, and has physical characteristics similar to its underlying photosensitive sheet;
   (c) means for imaging the display image onto photosensitive sheets including:
   (d) means effective after an image is formed on the display for deactivating the display image and including drive means for causing a cover sheet to be removed from the stack and then reactivate the display image, such means including:
      (i) optical means for focusing the display area onto said photosensitive sheet; and
      (ii) means for providing electronic communication between the electronic camera and the printer so that the printing area of said display is imaged on the uncovered photosensitive sheet.

* * * * *